United States Patent [19]

Morioka et al.

[11] Patent Number: 4,727,952
[45] Date of Patent: Mar. 1, 1988

[54] MOTORCYCLE, AND BODY STRUCTURE THEREFOR

[75] Inventors: Minoru Morioka, Saitama; Toshiaki Kishi, Tokyo; Toshiharu Yoshioka, Saitama, all of Japan

[73] Assignee: Honda Giken Kogyo Kabushiki Kaisha, Tokyo, Japan

[21] Appl. No.: 902,702

[22] Filed: Sep. 2, 1986

Related U.S. Application Data

[62] Division of Ser. No. 684,058, Dec. 20, 1984, Pat. No. 4,638,881.

[30] Foreign Application Priority Data

Dec. 26, 1983 [JP] Japan .................. 58-249773

[51] Int. Cl.⁴ .............................. B62K 11/04
[52] U.S. Cl. ................... 180/219; 180/291; 180/297; 180/312
[58] Field of Search ............ 180/219, 227, 291, 311, 180/312, 58, 297; 280/274, 275, 281 R

[56] References Cited

U.S. PATENT DOCUMENTS

| | | | |
|---|---|---|---|
| 1,198,669 | 9/1916 | Schwinn | 180/219 |
| 4,265,329 | 5/1981 | Cortanze | 180/219 |
| 4,339,964 | 7/1982 | Isaka | 180/219 |
| 4,347,909 | 9/1982 | Takemura | 180/219 |
| 4,436,172 | 3/1984 | Inoue | 180/219 |

FOREIGN PATENT DOCUMENTS 158616 1/1921 United Kingdom .............. 180/227
330309 6/1930 United Kingdom .............. 180/219

OTHER PUBLICATIONS

World PCT Publication #243, dated May 1979.

Primary Examiner—John J. Love
Assistant Examiner—Everett G. Diederiks, Jr.
Attorney, Agent, or Firm—Irving M. Weiner; Joseph P. Carrier; William D. Blackman

[57] ABSTRACT

A body structure for a motorcycle with a front wheel and a rear wheel, including a body frame assembly having an engine mounted thereon and having vertically swingably joined thereto a front leading arm for supporting the front wheel and a rear trailing arm for supporting the rear wheel. The front leading arm as viewed from the side thereof is curved upwardly in the direction of a steering axis of the front wheel. The body frame assembly is shaped in a concave form having front standing portions and rear standing portions to thereby surround the engine. The engine is a V-type with at least a pair of internal combustion cylinders substantially vertically arranged to be respectively forwardly and rearwardly inclined, and may be secured at a front part thereof to the front standing portions of the body frame assembly and at a rear part thereof to the rear standing portions of the body frame assembly. A shock absorber cooperation with the front leading arm and another shock absorber cooperating with the rear trailing arm are arranged under the body frame assembly which has the engine mounted thereon, to be oriented forwardly and rearwardly, respectively.

3 Claims, 11 Drawing Figures

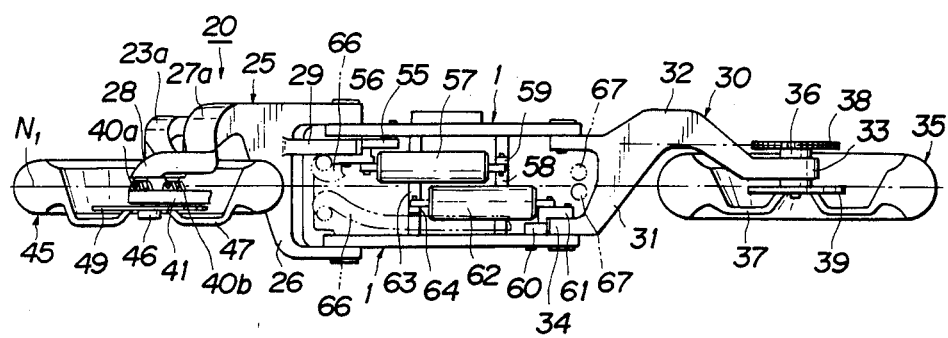
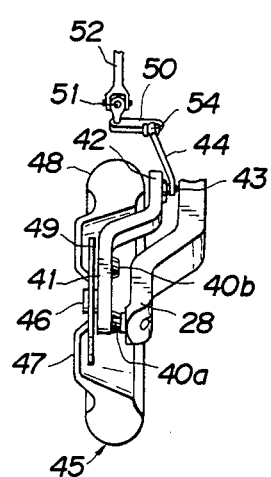
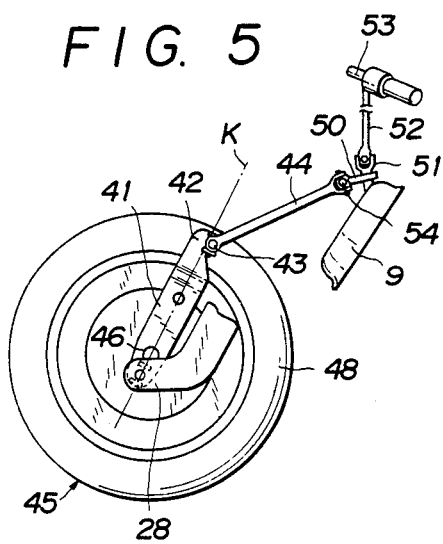
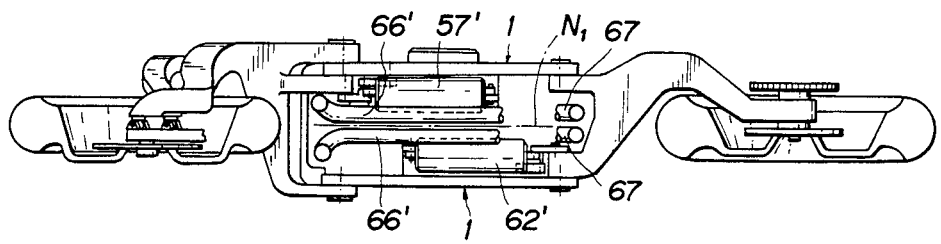

MOTORCYCLE, AND BODY STRUCTURE THEREFOR

This is a divisional of Application Ser. No. 684,058, filed Dec. 20, 1984, now U.S. Pat. No. 4,638,881.

BACKGROUND OF THE INVENTION

1. Field of the Invention

The present invention relates generally to a motorcycle and a body structure therefor. More particularly, the invention relates to a body structure for a motorcycle of the type which includes a body frame having an engine mounted thereon, a front leading arm for supporting a front wheel, the front leading arm being vertically swingably joined to the body frame, and a rear trailing arm for supporting a rear wheel, the rear trailing arm being vertically swingably joined to the body frame.

2. Description of Relevant Art

There has been proposed a motorcycle with a body structure including a body frame having a power unit disposed substantially in a central portion thereof, a swingable front arm extending forwardly of the power unit for supporting a front wheel, and a rear swingable arm extending rearwardly of the power unit for supporting a rear wheel. Such a structure is disclosed, for example, in Japanese Laid-Open Application No. JP-A-53-142739 laid open Dec. 12, 1978 and Japanese Laid-Open Application No. JP-A-54-122538 laid open Sept. 22, 1979.

In the structures disclosed in the aforesaid laid-open applications, the arm supporting the front wheel is a leading type front arm extending forwardly from a body frame having an engine mounted thereon, substantially linearly in the side view.

For example, in the aforesaid Japanese Application No JP-A-54-122538, as shown in FIG. 10 of the accompanying drawings, there are employed upper and lower front leading arms 91, 93 which are vertically swingably pivoted at their rear ends 91a, 93a on a body frame side member 90 fastened to an engine (not shown), respectively, the upper and lower front arms 91, 93 both extending forwardly of the member 90, substantially linearly in the side view and substantially parallel with each other. The front ends of the arms 91, 93 have a steering plate 95 operatively interposed therebetween for supporting in a cantilever manner an axle 97 of a front wheel 96. In FIG. 10, the left corresponds to the front of the member 90.

In a body structure for motorcycles having a front suspension with such a front leading arm, there is generally employed a cushion means for the suspension. In the structure disclosed in the aforesaid Japanese Application No. JP-A-54-122538, a single hydraulic damper (not shown) of a telescopic type is employed as such a cushion means, which damper is pivotably connected at its lower end to the substantially longitudinally intermediate part of the lower front arm 93 and at its upper end to a portion of the body frame side member 90 slightly above the upper front arm 91.

The steering plate 95 is adapted to be operable for steering the front wheel 96 with a steering mechanism (not shown) comprising a handlebar, a steering shaft, a knuckle arm, and a tie rod.

Further, in the structure disclosed in the aforesaid Japanese Application No. JP-A-54-122538, although not shown in the accompanying drawings, the aforesaid rear trailing arm, which comprises a swing arm vertically swingably pivoted at its front end on a body frame side member, constitutes a rear suspension having as a cushion means thereof a single hydraulic damper of a telescopic type. The damper is pivotably connected at its upper end to a body frame and at its lower end to a linkage interposed between the body frame and the rear trailing arm, the linkage comprising a small swingable arm and a connecting rod.

In the motorcycle proposed in the aforesaid Japanese Application No JP-A-53-142739, although the entire structure thereof is substantially the same as that disclosed in Japanese Application No. JP-A-54-122538, there are employed front and rear dampers both disposed higher than those of the latter case, thus going against the current trend of lowering the center of gravity.

In such conventional motorcycles, particularly in a motorcycle according to the aforesaid Japanese Application No. JP-A-54-122538, a front wheel can be steered independently of a front suspension, i.e., without requiring an accompanying movement such as of a damper and a leading arm, so that the steering load of the front wheel is remarkably decreased, thereby providing a favorably light steering of the front wheel in comparison with that of a well-known steering head type motorcycle in which a front fork and a pair of dampers constitute a front suspension.

However, as shown in FIG. 11 of the accompanying drawings, which is a bottom view of each front leading arm of FIG. 10, the front leading arm 93 (91) has a longitudinally intermediate portion 94 (92) thereof curved leftwardly of the motorcycle to provide a necessary steering angle $\alpha_0$ for the front wheel 96, which curved portion 94 (92) is therefore required to have an offset distance $\delta_0$ with respect to a longitudinal center line $N_0$ of the motorcycle, so that the motorcycle has an increased width. In this respect, decreasing the offset distance $\delta_0$ will result in failure to attain the steering angle $\alpha_0$.

Moreover, in a motorcycle of the type in question, although an engine contributes to some extent to the attainment of an increased rigidity of a body frame, there is a desideratum, in view of the recent trend of mounting a heavy V-type engine with at least a pair of combustion cylinders arranged at the front and rear to attain a high-power outout, for a body structure able to provide a sufficient rigidity and strength of the body frame, while providing a sufficiently lightweight body frame to offset the weight of the V-type engine.

Further, in the known body structure of the type in question, the body frame with an engine mounted thereon has, at its front and rear ends, front and rear dampers extending forwardly and rearwardly therefrom, respectively, thus failing to contribute to a compact design of a wheel base or to lowering of the center of gravity of the motorcycle.

The present invention effectively overcomes the disadvantages and shortcomings attendant a conventional body structure for motorcycles as described above, while at the same time fulfilling the aforesaid desideratum.

SUMMARY OF THE INVENTION

The present invention provides a body structure for a motorcycle with a front wheel and a rear wheel, comprising an engine, a body frame assembly having the engine mounted thereon, a front leading arm for supporting the front wheel, the front leading arm being vertically swingably joined at a rear portion thereof to the body frame assembly and being upwardly curved in the direction of a steering axis of the front wheel when viewed from the side of the motorcycle, a first shock absorber operatively connected to the front leading arm, a steering mechanism for steering the front wheel, the steering mechanism including a handlebar, a rear trailing arm for supporting the rear wheel, the rear trailing arm being vertically swingably joined at a front portion thereof to the body frame assembly, and a second shock absorber operatively connected to the rear trailing arm.

In the body structure according to the invention, the body frame assembly may be shaped in a substantially concave form having left and right front standing portions and left and right rear standing portions to thereby surround the engine, so that the engine is positioned on the body frame assembly substantially between the front standing portions and the rear standing portions.

Further in accordance with the invention, the engine may be a V-type engine with at least a pair of internal combustion cylinders vertically arranged with one forwardly inclined and the other rearwardly inclined, and the V-type engine may be secured at a front part thereof to the front standing portions of the body frame and at a rear part thereof to the rear standing portions of the body frame.

In additon, the first shock absorber and the second shock absorber may be arranged, under the body frame having the engine disposed thereon, to be oriented forwardly and rearwardly, respectively.

An object of the present invention is to provide a body structure for a motorcycle with a front wheel and a rear wheel, which has, while providing a sufficient steering angle for the front wheel, a reduced dimension in the transverse direction of the motorcycle, thereby successfully avoiding an undesired increase in the width dimension of the motorcycle.

Another object of the present invention is to provide a body structure for a motorcycle with a front wheel and a rear wheel, in which, while a sufficient rigidity and strength of a body frame is attained, the body frame is favorably lightweight and a wheel base of the front and rear wheels is minimized.

Still another object of the present invention is to provide a body structure for a motorcycle with a front wheel and a rear wheel, including a shock absorber arrangement which can favorably contribute to minimizing a wheel base of the front and rear wheels and lowering the center of gravity of the motorcycle, while providing a simplified and lightweight design of a body frame.

The above and further objects, details and advantages of the present invention will become apparent from the following detailed description of the preferred embodiment of the invention when the same is read in conjunction with the accompanying drawings.

BRIEF DESCRIPTION OF THE DRAWINGS

FIG. 3 is a bottom view of the body structure of FIG. 1.

FIG. 4 is a partially cut-away front view of a front wheel steering mechanism of the body structure of FIG. 1.

FIG. 5 is a partially cut-away side view of the front wheel steering mechanism of FIG. 4.

FIG. 9 is a bottom view of a body structure according to a modified example of the embodiment of FIG. 1.

DETAILED DESCRIPTION OF PREFERRED EMBODIMENT

Figure 1:
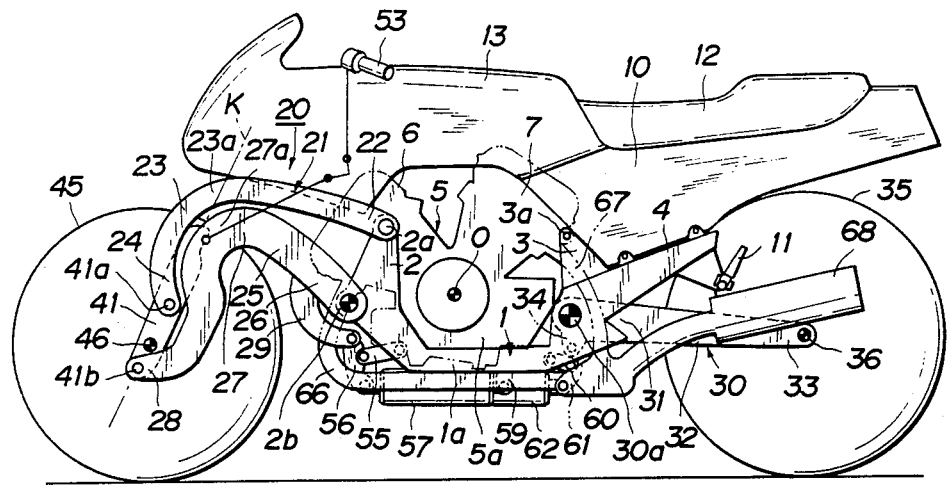
FIG. 1 is a side view of a motorcycle with a body structure according to a preferred embodiment of the invention.

With reference to FIG. 1, which illustrates a motorcycle with a body structure according to a preferred embodiment of the invention, designated at reference numeral is a rigid, steel-sheet body frame assembly of the motorcycle. The body frame assembly has a substantially concave shape in the side view thereof, and include left and right body frames 1, 1 respectively disposed on the left and right of the motorcycle. A V-type internal combustion engine 5 with a pair of vertical front cylinders 6 inclined forwardly and a pair of vertical rear cylinders 7 inclined rearwardly has a crankcase 5a thereof joined to a base part 1a of the body frames 1, 1. The engine 5 is further fastened at the side face of each front cylinder 6 thereof to an upper end part 2a of a front standing portion 2 of each of the body frames 1 and at the rear part of each rear cylinder 7 thereof to an upper end part 3a of a rear standing portion 3 of each of the body frames 1, whereby the engine 5 is mounted on the body frames 1 between the front standing portions 2 and the rear standing portions 3. Designated at reference character 0 is the center of a crankshaft of the engine 5.

The rear standing portion 3 of each body frame 1 is integrally provided with a rearwardly ascending step bracket 4' a rear body 10 comprising a seat cowl, a step 11, and other accessories is supportably fastened to the step bracket 4. The rear body 10 is tightly fixed at the front part thereof together with the rear standing portion 3 of the body frame 1 to the rear cylinder 7 of the engine 5. On the rear body 10 is disposed a driver's seat 12. Further, a front body 13 extending over the engine 5 is connected to the front part of the rear body 10. The front body 13 has accommodated therein a fuel tank (not shown).

The front standing portion 2 of each body frame 1 has pivoted thereon the rear end of a swingable arm 20 extending in a leading manner. Likewise, another swingable arm 30 extending in a trailing manner is pivoted at a front end 30a thereof to the rear standing portion 3 of each body frame 1. The rear trailing arm 30 is bifurcated in the proximal part thereof to define a fork portion 31 shown in FIG. 3, and is vertically swingably connected at the portion 31 to the substantially vertically intermediate part of the rear standing portion 3 of the body frame 1. As the rear trailing arm 30 extends rearwardly, it is bent in a central part 32 thereof to the left and again to the right to have a rear part 33 thereof positioned near and alongside a center line $N_1$ (FIG. 3) of the motorcycle, the rear part 33 supporting in a cantilever manner an axle 36 of a rear wheel 35. The axle 36 is operatively connected to an output shaft of the engine 5 through a chain and sprocket mechanism shown in FIG. 3.

Referring now to FIG. 3, which is a bottom view of the body structure of FIG. 1, the rear wheel 35 has a wheel hub 37 bulged to the right, in which hub 37 extends the rear part 33 of the rear trailing arm 30. Designated at reference numeral 38 is a driven sprocket, and at 39 is a brake disc.

Referring again to FIG. 1, the front leading arm 20 comprises an upper arm member 21 and a lower arm member 25. The upper arm member 21 has a proximal portion 22 thereof bifurcated to be pivotably connected at the rear ends thereof to the upper end part 2a of the front standing portion 2 of the body frame 1, while to an intermediate part 2b of the front standing portion 2 is pivotably connected the rear ends of a fork portion 26 of the lower arm member 25. The upper and lower arm members 21, 25 of the front leading arm 20 have their intermediate portions 23, 27 disposed at the left of the motorcycle and formed as arcuate parts 23a, 27a upwardly curved in the direction of a steering axis K of a front wheel 45 when viewed from the side, respectively, so as to have their front portions 24, 28 approach a body center line, i.e., the center line $N_1$ of the motorcycle. To the front portions 24, 28 of the upper and lower arm members 21, 25 is connected a steering plate 41 at central and lower parts 41a, 41b thereof, respectively, transversely steerably through corresponding joints 40a, 40b shown in FIG. 3. The steering plate 41 is adapted to support in cantilever fashion, at a point thereon near the lower part 41b, an axle 46 of the front wheel 45.

Figure 2:
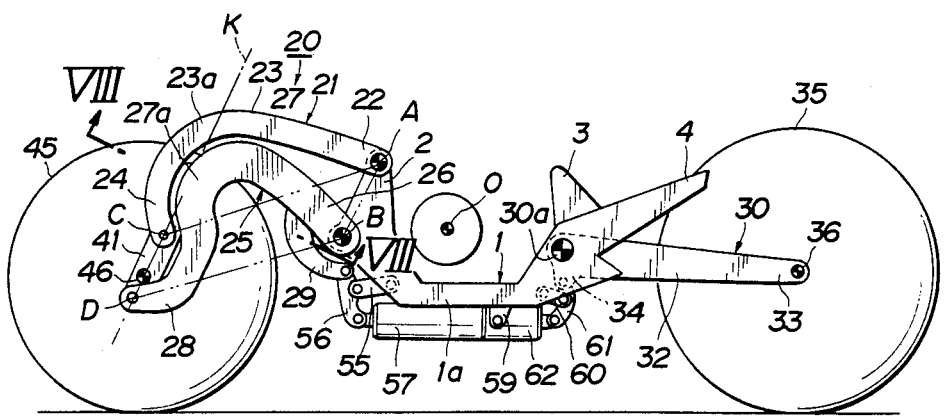
FIG. 2 is a side view of the body structure of FIG. 1.

Accordingly, as shown in FIG. 2, the front leading arm 20 constitutes a parallel link mechanism having, on the power unit side thereof, a pair of pivot points A, B (corresponding to the upper end part 2a and the intermediate part 2b of the standing portion 2 of the body frame 1) spaced apart from each other along a rearwardly ascending line on the front standing portion 2 and, on the steering plate side thereof, another pair of pivot points C, D (corresponding to the central and lower parts 41a, 41b of the steering plate 41) spaced in a similar manner.

The steering plate 41 is extended upwardly along the steering axis K of the front wheel 45, to have an upper part 42 bent to extend along the upper left side of a tire 48 of the front wheel 45, to which upper part 42 a connecting rod 44 is operatively connected through a joint 43. On the other hand, a steering arm 50, which the front cylinder 6 of the engine 5 horizontally pivotably supports on the upper part of a head cover 9 thereof (FIG. 5), is connected at the proximal end thereof through a joint 51 to the lower end of a steering stem 52, which in turn is secured at the upper end thereof to a handlebar 53, whereas the distal end of the steering arm 50 is operatively connected through a joint 54 to the connecting rod 43.

In the foregoing arrangement, as shown in FIG. 4, the wheel hub 47 of the front wheel 45 is expanded rightwardly to accommodate therein the respective front portions 24, 28 of the upper and lower arms members 21, 25 and the steering plate 41. Designated at reference numeral 49 is a brake disc of the front wheel 45.

Referring again to FIG. 1, the front standing portion 2 of the body frame 1 on the left side has pivoted thereon, at the inside of the lower part thereof, the rear end of a bracket 55 extending forwardly and pivotably connected at the front end thereof to the substantially intermediate part of a vertically arranged link 56, which in turn is pivotably connected at the upper end thereof to the lower end of a lever 29 projecting arcuately downwardly from the left proximal part of the fork portion 26 of the lower arm member 25, the lever 29 being integrally formed with the lower arm member 25. The lower end of the link 56 is pivotably connected to the front end of a front shock absorber 57. Accordingly, the bracket 55 and the link 56 serve as a linkage for interconnecting the lower arm member 25 with the shock absorber 57.

As shown in FIG. 3, the front shock absorber 57 is arranged under the body frame 1 at the left side and oriented longitudinally of the motorcycle. The rear end of the shock absorber 57 is pivotably supported on a bracket 59 extending downwardly from a cross member 58 extending transversely between the right and left body frames 1. The shock absorber 57 is disposed under the front part of the left body frame 1, near the body center line $N_1$.

Referring again to FIG. 1, the rear standing portion 3 of the body frame 1 has pivoted on the right side, on the inside of the lower part thereof, the front end of a bracket 60 extending rearwardly and pivotably connected at the rear end thereof to the substantially intermediate part of a vertically arranged link 61, which in turn is pivotably connected at the upper end thereof to a boss 34 extending downwardly from the right proximal part of the fork portion 31 of the rear trailing arm 30, the boss 34 being integrally formed with the rear trailing arm 30. The lower end of the link 61 is pivotably connected to the rear end of a rear shock absorber 62. Accordingly, the bracket 60 and the link 61 serve as a linkage for interconnecting the rear trailing arm 30 with the shock absorber 62.

As shown in FIG. 3, the rear shock absorber 62 is arranged under the body frame 1 at the right side and oriented in parallel with the front shock absorber 57. The front end of the shock absorber 62 is pivotably supported on a bracket 64 extending downwardly from a cross member 63 extending transversely between the right and left body frames 1, 1. The shock absorber 62 is disposed under the rear part of the right body frame 1, near the center line $N_1$.

As shown in FIGS. 1 and 3, from each of the front cylinders 6 of the engine 5, there downwardly extends one of a pair of exhaust pipes 66, 66, which pipes 66, 66 in turn are rearwardly bent to extend side-by-side under the body frames 1, 1 and then joined with another pair of exhaust pipes 67, 67 each respectively extending downwardly from behind one of the rear cylinders 7 of the engine 5, to be connected to a pair of mufflers 68, 68, respectively, at which location, as shown in FIG. 3, the exhaust pipes 66, 66 from the front cylinders 6 are disposed outside of the two shock absorbers 57, 62 within the width of a body frame assembly comprising the left and right body frames 1, 1.

Figure 7:
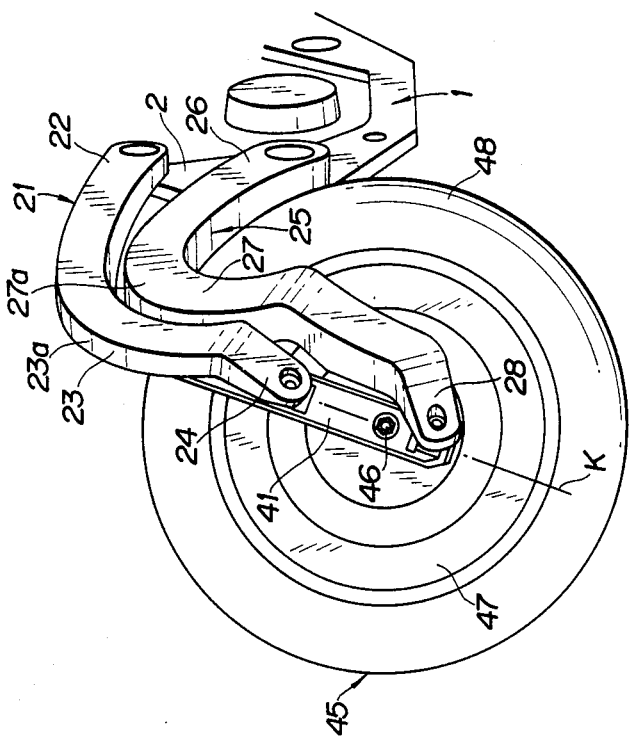
FIG. 7 is a perspective view of the essential part of FIG. 6, as the front wheel is steered rightwardly.
Figure 6:
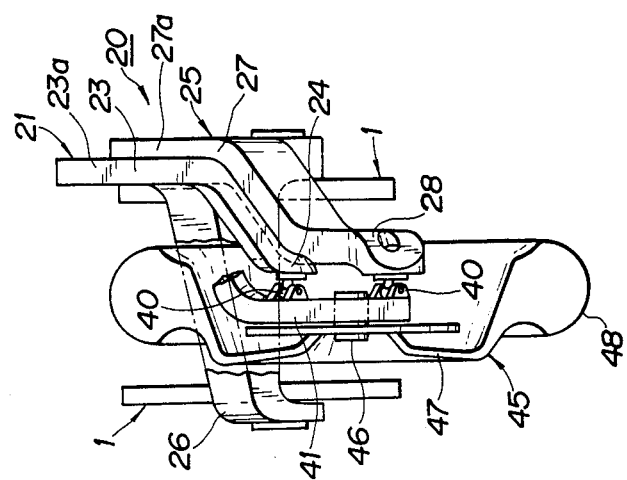
FIG. 6 is an enlarged partially cut-away front view of an essential part with a front wheel and front leading arms of the body structure of FIG. 1.

Referring now to FIGS. 6 and 7, the upper and lower arm members 21, 25 of the front leading arm 20 are curved in the lengthwise intermediate portions 23, 27 thereof, upwardly in the direction of the steering axis K of the front wheel 35, to thereby provide the arcuate parts 23a, 27a, as described hereinabove. As a result, the arcuate parts 23a, 27a are both located, above the steering plate 41 extending upwardly along the steering axis K, at the left of the upper part of the tire 48 of the front wheel 45. More particularly, the arcuate part 23a of the upper arm member 21 is positioned in front of the steering axis K, and the arcuate part 27a of the lower arm member 25, behind the steering axis K.

Figure 8:
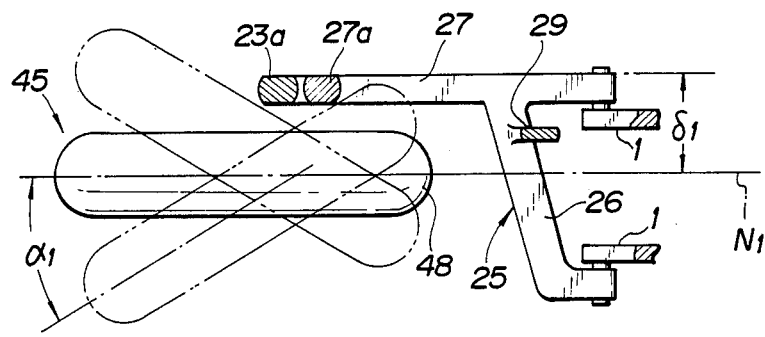
FIG. 8 is an enlarged sectional view taken along line VIII—VIII of FIG. 2.
Figure 10:
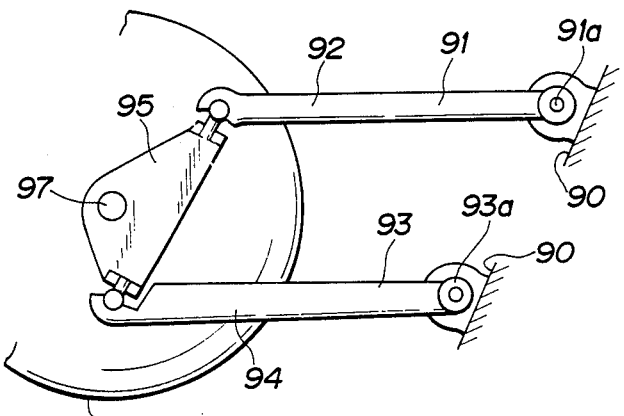
FIG. 10 is a schematic side view of an essential part with front leading arms of a conventional body structure.
Figure 11:
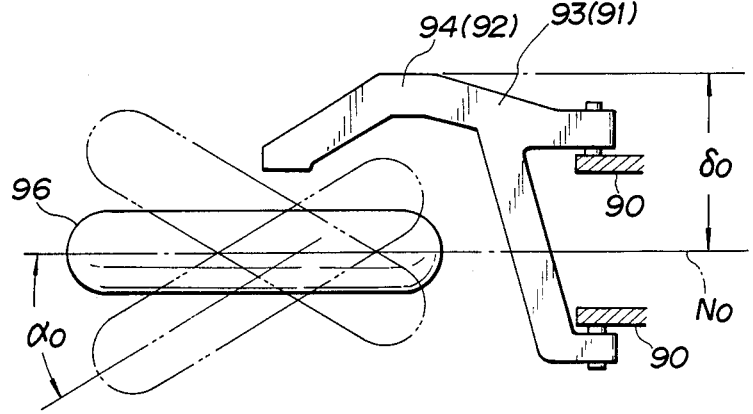
FIG. 11 is a perspective bottom view in the direction of arrow XI of FIG. 10.

Referring now to FIG. 8, because they are curved upwardly in the direction of the steering axis K of the front wheel 45, the upper and lower arm members 21, 25 constituting the front leading arm 20 are permitted to have their offset distance $\delta_1$ with respect to the body center line $N_1$ favorably decreased, while providing a sufficient steering angle $\alpha_1$ for the front wheel 45, to thereby prevent an interference which otherwise might take place between the front leading arm 20 and the rear part of the front wheel 45 as steered to the right.

The steering angle $\alpha_1$ of the front wheel 45, which corresponds to the turning angle of the handlebar 53, may be favorably set to be approximately 38 degrees for general purposes, and between 30 degrees to 33 degrees for a racer type motorcycle. In the latter case, the steering angle may preferably be set at 33 degrees by suppressing the offset distance $\delta_1$.

As described hereinabove in connection with FIG. 2, the upper and lower arm members 21, 25 are adapted to constitute, in cooperation with the front standing portion 2 of the body frame 1 and the steering plate 41 of the front wheel 45, a parallel linkage $\overline{ABCD}$ in which the pivot points A, B at the power unit side are positioned higher than the corresponding pivot points C, D at the steering plate side. As a result, when hitting a bump, the front wheel 45 makes the axle 46 trace a substantially forwardly extending trace. In this respect, the pivot points A and B may be lowered, for example to the same levels as the pivot points C and D, respectively, so that when hitting a bump the front axle 46 may be let, not forwardly, but loosely backwardly. Such being the case, the axle 46 may have its trace voluntarily selected.

Moreover, the pivot points C, D of the respective front portions 24, 28 of the upper and lower arm members 21, 25 may be voluntarily displaced on the steering plate 41, so that the front wheel 45 may have a voluntarily selected caster angle.

As will be understood from the foregoing description, according to the preferred embodiment of the invention, the body structure with the distinctive leading arm 20 favorably ensures setting of a necessary turning angle of the handlebar 53 as well as minimization of the transverse offset distance $\delta_1$.

Further, according to the preferred embodiment, in the body structure of the motorcycle with the front wheel 45 and the rear wheel 35, in which the body frame assembly has vertically swingably joined thereto the front leading arm 20 for supporting the front wheel 45 and the rear trailing arm 30 for supporting the rear wheel 35, the body frames 1, 1 as assembled are shaped in a unique form, substantially concave in the side view, having their front standing portions 2 at the left and right and their rear standing portions at the left and right, thereby surrounding the V-type engine 5, which has a V-form in the side view, while joining the front cylinders 6 thereof to the front standing portions 2 and the rear cylinders thereof to the rear standing portions 3. As a result, by use of the engine 5, the body frames 1, 1, which are concaved to minimize the weight thereof, are favorably reinforced at the front and rear standing portions 2, 3, which are spaced apart from each other, respectively. Accordingly, the body frame assembly has an enhanced rigidity and strength.

In this respect, the joining between the V-type engine 5 and the body frame assembly is not limited to cylinder portions of the engine 5, but may be effected at other suitable places such as between the crankcase 5a of the engine 5 and the respective front and rear standing portions 2, 3 of the body frames 1.

Furthermore, in the present embodiment, the respective front standing portions 2 of the body frames 1 are disposed alongside the corresponding front cylinders 6 of the V-type engine 5, so that the respective power unit side pivot points A, B of the upper and lower arm members 21, 25 constituting the front leading arm 20 extending forwardly from the front standing portions 2, may be let back to outside of the corresponding front cylinders 6. The leading dimension of the front leading arm 20 is thus shortened, permitting minimization of the wheel base of the motorcycle.

As also apparent, such a joining system may be applied to the connection between a body frame and a V-type engine of a motorcycle with a link-type front suspension.

As will be understood from the foregoing description, according to the present invention there is attained, in a body structure for a motorcycle with a front wheel and a rear wheel in which a body frame has vertically swingably joined thereto a front leading arm for supporting the front wheel and a rear trailing arm for supporting the rear wheel, an improvement including a lightweight design of the body frame and a sufficient rigidity and strength thereof as ensured by a reinforcing effect with the use of a V-type engine, in addition to minimization of a wheel base.

Still more, according to the preferred embodiment of the invention, the shock absorbers 57, 62 responding to swing motions of the front leading arm 20 and the rear trailing arm 30, respectively, are longitudinally arranged under the body frames 1 having mounted thereon the engine 5 as a power unit, so that the shock absorbers are prevented from longitudinally projecting beyond the longitudinal length of the body frame assembly, thus permitting an additional dimensional reduction of the wheel base. Such a shock absorber arrangement also permits structural simplification of the body frame assembly, thus additionally contributing to a lightweight design thereof.

In the preferred embodiment, as shown in FIG. 3, the shock absorbers 57, 62 are both positioned close to the body center line $N_1$, having disposed outside thereof the exhaust pipes 66, 66 from the front cylinders 6 of the engine 5. In this respect, the shock absorbers and exhaust pipes may alternatively be arranged in other suitable ways, such as in a below-described modification.

Referring now to FIG. 9, in a modified example, the left and right shock absorbers 57', 62' are arranged close to left and right body frames 1, 1, respectively, while a pair of exhaust pipes 66', 66' from a pair of front cylinders 6 of an engine 5 are both positioned near a body center line $N_1$, so that the exhaust pipes 66', 66' are disposed between the shock absorbers 52, 62.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A body structure for a motorcycle with a front wheel and a rear wheel, comprising:
   an engine;
   a rigid body frame assembly having said engine mounted thereon;
   a front leading arm for supporting said front wheel;
   said front leading arm being vertically swingably joined at a rear portion thereof to said rigid body frame assembly;
   a first shock absorber operatively connected to said front leading arm;
   a steering mechanism for steering said front wheel;
   said steering mechanism including a handlebar;
   a rear trailing arm for supporting said rear wheel;
   said rear trailing arm being vertically swingably joined at a front portion thereof to said rigid body frame assembly;
   a second shock absorber operatively connected to said rear trailing arm;
   said rigid body frame assembly integrally including left and right front standing portions and left and right rear standing portions which are spaced apart from each other so as to be shaped as a whole in a substantially concave form in side view and said engine being disposed in said rigid body frame assembly substantially between said front standing portions and said rear standing portions;
   said engine being a V-type engine with at least a pair of internal combustion cylinders substantially vertically arranged to be forwardly inclined and rearwardly inclined, respectively;
   said V-type engine being secured at a front part thereof to said front standing portions of said rigid body frame assembly and at a rear part thereof to said rear standing portions of said rigid body frame assembly, and
   said rigid body frame assembly further integrally includes rearwardly extending step brackets having steps, said step brackets being provided on said rear standing portions.

2. A body strructure for a motorcycle with a front wheel and a rear wheel, comprising:
   an engine;
   a rigid body frame assembly having said engine mounted thereon;
   a front leading arm for supporting said front wheel;
   said front leading arm being vertically swingably joined at a rear portion thereof to said rigid body frame assembly;
   a first shock absorber operatively connected to said front leading arm;
   a steering mechanism for steering said front wheel;
   said steering mechanism including a handlebar;
   a rear trailing arm for supporting said rear wheel;
   said rear trailing arm being vertically swingably joined at a front portion thereof to said rigid body frame assembly;
   a second shock absorber operatively connected to said rear trailing arm;
   said rigid body frame assembly integrally including left and right front standing portions and left and right rear standing portions which are spaced apart from each other as as to be shaped as a whole in a substantially concave form in side view and said engine being disposed in said rigid body frame assembly substantially between said front standing portions and said rear standing portions;
   said engine being a V-type engine with at least a pair of internal combustion cylinders substantially vertically arranged to be forwardly inclined and rearwardly inclined, respectively;
   said V-type engine being secured at a front part thereof to said front standing portions of said rigid body frame assembly and at a rear part thereof to said rear standing portions of said rigid body frame assembly;
   said front standing portions of said rigid body frame assembly are disposed alongside said forwardly inclined internal combustion cylinder and secured at the upper ends thereof to corresponding side faces of said forwardly inclined internal combustion cylinder; and
   said rear standing portions of said rigid body frame assembly are secured at the upper ends thereof to a part of said rearwardly inclined internal combustion cylinder.

3. A body structure according to claim 2, wherein:
   said rigid body frame assembly further integrally includes two transversely extending cross members positioned below said engine.

* * * * *

UNITED STATES PATENT AND TRADEMARK OFFICE
CERTIFICATE OF CORRECTION

PATENT NO. : 4,727,952
DATED : March 1, 1988
INVENTOR(S) : Morioka et al.

It is certified that error appears in the above-identified patent and that said Letters Patent is hereby corrected as shown below:

Column 2, line 46, change "outout" to --output--.
Column 3, line 28, correct the spelling of --addition--.
Column 4, line 22, delete "designated at reference";
         line 23, change "numeral" to --there--; after "is" insert --shown--;
         line 26, change "include" to --includes--;
         line 44, change "4' a"" to --4. A--.
Column 5, line 63, change "arms" to --arm--.
Column 9, line 46 (claim 2, line 1), correct the spelling of --structure--
Column 10, line 20 (claim 2, line 23), after "other" delete "as" (one occurrence).
In the Abstract, line 18, change "cooperation" to --cooperating--.

Signed and Sealed this

Second Day of August, 1988

Attest:

DONALD J. QUIGG

*Attesting Officer*    *Commissioner of Patents and Trademarks*